United States Patent
Lanahan et al.

(10) Patent No.: US 11,017,160 B2
(45) Date of Patent: May 25, 2021

(54) SYSTEMS AND METHODS FOR PUBLISHING AND/OR SHARING MEDIA PRESENTATIONS OVER A NETWORK

(75) Inventors: James W Lanahan, Palo Alto, CA (US); Dane M Howard, Los Gatos, CA (US); Brian F Williams, San Carlos, CA (US); Luke Peacock, Fremont, CA (US); Belmer Perrella Garcia Negrillo, San Francisco, CA (US)

(73) Assignee: eBay Inc., San Jose, CA (US)

(*) Notice: Subject to any disclaimer, the term of this patent is extended or adjusted under 35 U.S.C. 154(b) by 884 days.

(21) Appl. No.: 12/347,747

(22) Filed: Dec. 31, 2008

(65) Prior Publication Data

US 2010/0005498 A1  Jan. 7, 2010

Related U.S. Application Data

(60) Provisional application No. 61/078,288, filed on Jul. 3, 2008.

(51) Int. Cl.
*G06F 3/00* (2006.01)
*G06F 13/00* (2006.01)
(Continued)

(52) U.S. Cl.
CPC .......... *G06F 40/169* (2020.01); *G06F 3/0482* (2013.01); *G06F 3/04817* (2013.01);
(Continued)

(58) Field of Classification Search
CPC ......... H04N 21/2743; H04N 21/47205; H04N 1/00196; H04N 21/27; H04N 21/274;
(Continued)

(56) References Cited

U.S. PATENT DOCUMENTS 5,539,871 A 7/1996 Gibson
5,541,662 A * 7/1996 Adams ............... G06F 3/14
                                              348/460
(Continued)

FOREIGN PATENT DOCUMENTS

JP  2008-183330  8/2008
WO  2000/007110  2/2000
(Continued)

OTHER PUBLICATIONS

US 10,108,583 B2, 10/2018, Lanahan et al. (withdrawn)
(Continued)

*Primary Examiner* — Kyu Chae
(74) *Attorney, Agent, or Firm* — Faegre Drinker

(57) ABSTRACT

In accordance with one or more embodiments of the present disclosure, systems and methods for publishing and/or sharing media presentations over a network comprise communicating with a user and one or more distribution channels via the network, gathering media resources based on user input, creating a media presentation with the media resources based on user input, and publishing the media presentation by distributing the media presentation to the one or more distribution channels via the network. In one aspect, publishing comprises directly emailing the media presentation to one or more other users via the network. In another aspect, publishing comprises providing a link to one or more other users via the network for direct access to the media presentation. In still another aspect, publishing comprises obtaining and embedding source code for the media presentation in a web page associated with one or more of the distribution channels via the network.

20 Claims, 4 Drawing Sheets

(51) Int. Cl.

| | | |
|---|---|---|
| H04N 5/445 | (2011.01) | |
| G06F 40/169 | (2020.01) | |
| G06F 16/43 | (2019.01) | |
| G06F 16/44 | (2019.01) | |
| G06F 16/28 | (2019.01) | |
| G06F 16/435 | (2019.01) | |
| G06F 16/438 | (2019.01) | |
| G06F 16/242 | (2019.01) | |
| G06F 16/33 | (2019.01) | |
| G06F 16/9535 | (2019.01) | |
| G06F 16/957 | (2019.01) | |
| G06T 11/60 | (2006.01) | |
| G06F 40/14 | (2020.01) | |
| G06F 40/103 | (2020.01) | |
| G06F 40/106 | (2020.01) | |
| G06F 40/166 | (2020.01) | |
| G06F 40/134 | (2020.01) | |
| G06F 3/0482 | (2013.01) | |
| G06F 3/0481 | (2013.01) | |
| G06Q 30/02 | (2012.01) | |

(52) U.S. Cl.
CPC ........ *G06F 16/2428* (2019.01); *G06F 16/285* (2019.01); *G06F 16/3344* (2019.01); *G06F 16/43* (2019.01); *G06F 16/435* (2019.01); *G06F 16/438* (2019.01); *G06F 16/44* (2019.01); *G06F 16/9535* (2019.01); *G06F 16/9577* (2019.01); *G06F 40/103* (2020.01); *G06F 40/106* (2020.01); *G06F 40/134* (2020.01); *G06F 40/14* (2020.01); *G06F 40/166* (2020.01); *G06T 11/60* (2013.01); *G06Q 30/02* (2013.01); *G06T 2200/24* (2013.01)

(58) Field of Classification Search
CPC ............. H04N 21/278; H04N 21/2187; H04N 21/2747; G06F 17/211; G06F 17/248
USPC .......... 725/112, 114; 709/231; 715/235, 236, 715/741, 743, 788, 204
See application file for complete search history.

(56) References Cited

U.S. PATENT DOCUMENTS

| | | | |
|---|---|---|---|
| 5,559,942 A | 9/1996 | Gough et al. | |
| 5,578,808 A | 11/1996 | Taylor | |
| 5,666,554 A | 9/1997 | Tanaka | |
| 5,708,845 A | 1/1998 | Wistendahl et al. | |
| 5,844,557 A | 12/1998 | Shively, II | |
| 5,860,073 A * | 1/1999 | Ferrel | G06F 17/218 715/255 |
| 5,918,012 A | 6/1999 | Astiz et al. | |
| 5,933,817 A | 8/1999 | Hucal | |
| 6,008,807 A | 12/1999 | Bretschneider et al. | |
| 6,038,552 A | 3/2000 | Fleischi et al. | |
| 6,097,389 A | 8/2000 | Morris et al. | |
| 6,154,771 A | 11/2000 | Rangan et al. | |
| 6,259,457 B1 | 7/2001 | Davies | |
| 6,397,196 B1 | 5/2002 | Kravetz et al. | |
| 6,470,100 B2 | 10/2002 | Horiuschi | |
| 6,515,656 B1 | 2/2003 | Wittenburg | |
| 6,647,383 B1 | 11/2003 | August et al. | |
| 6,693,649 B1 | 2/2004 | Lipscomb et al. | |
| 6,751,776 B1 | 6/2004 | Gong | |
| 6,769,095 B1 * | 7/2004 | Brassard | G06F 8/51 715/234 |
| 6,789,060 B1 | 9/2004 | Wolfe et al. | |
| 6,834,282 B1 * | 12/2004 | Bonneau | G06F 17/30961 |
| 6,928,610 B2 | 8/2005 | Brintzenhofe et al. | |
| 7,023,452 B2 | 4/2006 | Oshiyama et al. | |
| 7,181,468 B2 | 2/2007 | Spring et al. | |
| 7,237,185 B1 * | 6/2007 | Sequeira | 715/209 |
| 7,296,242 B2 | 11/2007 | Agata et al. | |
| 7,376,290 B2 * | 5/2008 | Anderson et al. | 382/311 |
| 7,409,543 B1 | 8/2008 | Bjorn | |
| 7,469,380 B2 | 12/2008 | Wessling et al. | |
| 7,502,795 B1 * | 3/2009 | Svendsen et al. | |
| 7,546,554 B2 | 6/2009 | Chiu et al. | |
| 7,573,486 B2 | 8/2009 | Mondry | |
| 7,576,555 B2 | 8/2009 | Hashimoto | |
| 7,576,755 B2 | 8/2009 | Sun et al. | |
| RE41,210 E * | 4/2010 | Wang | H04N 21/234363 709/203 |
| 7,725,494 B2 | 5/2010 | Rogers et al. | |
| 7,752,548 B2 | 7/2010 | Mercer | |
| 7,768,535 B2 | 8/2010 | Reid et al. | |
| 7,805,382 B2 | 9/2010 | Rosen et al. | |
| 7,814,560 B2 * | 10/2010 | Bellagamba et al. | 726/28 |
| 7,836,110 B1 | 11/2010 | Schoenbach et al. | |
| 7,885,951 B1 | 2/2011 | Rothschild | |
| 7,885,955 B2 | 2/2011 | Hull et al. | |
| 7,982,909 B2 * | 7/2011 | Beato | G06F 17/30265 348/231.2 |
| 8,006,192 B1 | 8/2011 | Reid et al. | |
| 8,010,629 B2 | 8/2011 | Williams et al. | |
| 8,019,579 B1 | 9/2011 | Wey et al. | |
| 8,024,658 B1 | 9/2011 | Fagans et al. | |
| 8,082,328 B2 * | 12/2011 | Hull et al. | 709/219 |
| 8,103,546 B1 | 1/2012 | De Jardins | |
| 8,121,902 B1 * | 2/2012 | Desjardins | G06Q 30/0282 705/26.1 |
| 8,131,114 B2 | 3/2012 | Wang et al. | |
| 8,180,178 B2 | 5/2012 | Cheatle | |
| 8,316,084 B2 | 11/2012 | Lanahan et al. | |
| 8,365,092 B2 | 1/2013 | Lanahan et al. | |
| 8,560,565 B2 | 10/2013 | Howard et al. | |
| 8,620,893 B2 | 12/2013 | Howard et al. | |
| 8,627,192 B2 | 1/2014 | Lanahan et al. | |
| 8,667,160 B1 | 3/2014 | Haot et al. | |
| 8,789,094 B1 | 7/2014 | Singh | |
| 8,799,952 B2 * | 8/2014 | Gossweiler, III | G06F 17/30867 725/44 |
| 8,812,945 B2 | 8/2014 | Sidon | |
| 8,893,015 B2 | 11/2014 | Lanahan et al. | |
| 9,043,726 B2 | 5/2015 | Lanahan et al. | |
| 9,058,765 B1 | 6/2015 | Mallick et al. | |
| 9,165,388 B2 | 10/2015 | Delia et al. | |
| 9,430,448 B2 | 8/2016 | Howard et al. | |
| 9,613,006 B2 | 4/2017 | Lanahan et al. | |
| 9,639,505 B2 | 5/2017 | Lanahan et al. | |
| 9,658,754 B2 | 5/2017 | Lanahan et al. | |
| 10,157,170 B2 | 12/2018 | Howard et al. | |
| 10,706,222 B2 | 7/2020 | Lanahan et al. | |
| 10,853,555 B2 | 12/2020 | Lanahan et al. | |
| 2001/0034740 A1 | 10/2001 | Kerne | |
| 2001/0044825 A1 | 11/2001 | Barritz | |
| 2001/0044835 A1 | 11/2001 | Schnober | |
| 2001/0050681 A1 | 12/2001 | Keys et al. | |
| 2002/0023111 A1 | 2/2002 | Arora et al. | |
| 2002/0080165 A1 | 6/2002 | Wakefield | |
| 2002/0083178 A1 | 6/2002 | Brothers | |
| 2002/0091600 A1 | 7/2002 | Kravetz et al. | |
| 2002/0108122 A1 | 8/2002 | Alao et al. | |
| 2002/0112093 A1 | 8/2002 | Slotznick | |
| 2002/0135621 A1 | 9/2002 | Angiulo et al. | |
| 2002/0138428 A1 | 9/2002 | Spear | |
| 2002/0152233 A1 | 10/2002 | Cheong et al. | |
| 2002/0164151 A1 | 11/2002 | Jasinschi | |
| 2002/0180803 A1 * | 12/2002 | Kaplan | G06F 17/30017 715/810 |
| 2003/0014510 A1 | 1/2003 | Avvari et al. | |
| 2003/0046222 A1 | 3/2003 | Bard et al. | |
| 2003/0098877 A1 | 5/2003 | Boegelund | |
| 2003/0149983 A1 | 8/2003 | Markel | |
| 2004/0008226 A1 | 1/2004 | Manolis et al. | |
| 2004/0021684 A1 | 2/2004 | Millner | |
| 2004/0054579 A1 | 3/2004 | Lamb et al. | |
| 2004/0083080 A1 | 4/2004 | Reghetti et al. | |

(56) References Cited

U.S. PATENT DOCUMENTS

| | | | |
|---|---|---|---|
| 2004/0091232 A1* | 5/2004 | Appling, III | G11B 27/105 386/230 |
| 2004/0143796 A1 | 7/2004 | Lerner et al. | |
| 2004/0184778 A1 | 9/2004 | Jung et al. | |
| 2004/0199574 A1 | 10/2004 | Franco et al. | |
| 2004/0001106 A1 | 12/2004 | Deutscher et al. | |
| 2004/0268224 A1 | 12/2004 | Balkus et al. | |
| 2005/0007382 A1 | 1/2005 | Schowtka | |
| 2005/0069225 A1 | 3/2005 | Schneider et al. | |
| 2005/0094014 A1 | 5/2005 | Haas et al. | |
| 2005/0114356 A1* | 5/2005 | Bhatti | G06F 17/30115 |
| 2005/0114754 A1 | 5/2005 | Miller et al. | |
| 2005/0114784 A1 | 5/2005 | Spring et al. | |
| 2005/0138193 A1 | 6/2005 | Encarnacion et al. | |
| 2005/0149970 A1* | 7/2005 | Fairhurst | H04N 21/478 725/47 |
| 2005/0228749 A1 | 10/2005 | Lozano | |
| 2005/0234981 A1 | 10/2005 | Manousos et al. | |
| 2005/0235201 A1 | 10/2005 | Brown et al. | |
| 2005/0237952 A1 | 10/2005 | Punj | |
| 2005/0268227 A1 | 12/2005 | Carlson | |
| 2005/0268279 A1 | 12/2005 | Paulsen et al. | |
| 2005/0273693 A1 | 12/2005 | Peterson | |
| 2006/0010162 A1 | 1/2006 | Stevens | |
| 2006/0036949 A1* | 2/2006 | Moore | G06F 3/0482 715/730 |
| 2006/0061595 A1 | 3/2006 | Goede et al. | |
| 2006/0064642 A1 | 3/2006 | Iyer | |
| 2006/0069989 A1 | 3/2006 | Jones | |
| 2006/0070005 A1 | 3/2006 | Gilbert et al. | |
| 2006/0086843 A1 | 4/2006 | Lin et al. | |
| 2006/0089843 A1 | 4/2006 | Flather | |
| 2006/0106693 A1 | 5/2006 | Carlson et al. | |
| 2006/0112081 A1 | 5/2006 | Qureshi | |
| 2006/0114510 A1 | 6/2006 | Maeng | |
| 2006/0123455 A1* | 6/2006 | Pai et al. | 725/133 |
| 2006/0129917 A1 | 6/2006 | Volk et al. | |
| 2006/0181736 A1 | 8/2006 | Quek et al. | |
| 2006/0184574 A1 | 8/2006 | Wu et al. | |
| 2006/0193008 A1 | 8/2006 | Osaka | |
| 2006/0195789 A1 | 8/2006 | Rogers et al. | |
| 2006/0203294 A1 | 9/2006 | Makino | |
| 2006/0206811 A1 | 9/2006 | Dowdy | |
| 2006/0209214 A1 | 9/2006 | Fader et al. | |
| 2006/0230332 A1 | 10/2006 | Lin | |
| 2006/0256739 A1 | 11/2006 | Seier et al. | |
| 2006/0271691 A1 | 11/2006 | Jacobs et al. | |
| 2006/0277482 A1 | 12/2006 | Hoffman et al. | |
| 2006/0287989 A1* | 12/2006 | Glance | G06F 17/30587 |
| 2007/0016930 A1 | 1/2007 | Wesemann | |
| 2007/0033059 A1 | 2/2007 | Adkins | |
| 2007/0038931 A1* | 2/2007 | Allaire | G06Q 30/0239 715/206 |
| 2007/0050718 A1 | 3/2007 | Moore et al. | |
| 2007/0061266 A1 | 3/2007 | Moore | |
| 2007/0061715 A1 | 3/2007 | Chartier et al. | |
| 2007/0070066 A1* | 3/2007 | Bakhash | G06F 3/04815 345/419 |
| 2007/0074110 A1 | 3/2007 | Miksovsky et al. | |
| 2007/0078989 A1 | 4/2007 | Van Datta et al. | |
| 2007/0089057 A1 | 4/2007 | Kindig | |
| 2007/0113250 A1 | 5/2007 | Logan et al. | |
| 2007/0118801 A1* | 5/2007 | Harshbarger et al. | 715/730 |
| 2007/0130177 A1 | 6/2007 | Schneider et al. | |
| 2007/0136194 A1 | 6/2007 | Sloan | |
| 2007/0136244 A1 | 6/2007 | Maclaurin et al. | |
| 2007/0156382 A1 | 7/2007 | Graham | |
| 2007/0156434 A1* | 7/2007 | Martin | G06Q 10/06 705/1.1 |
| 2007/0162853 A1 | 7/2007 | Weber et al. | |
| 2007/0162856 A1 | 7/2007 | Schlossberg | |
| 2007/0186182 A1 | 8/2007 | Schiller | |
| 2007/0204208 A1 | 8/2007 | Cheng et al. | |
| 2007/0204209 A1 | 8/2007 | Truelove et al. | |
| 2007/0239770 A1 | 10/2007 | Enock et al. | |
| 2007/0245243 A1 | 10/2007 | Lanza et al. | |
| 2007/0253028 A1 | 11/2007 | Widdowson | |
| 2007/0262995 A1 | 11/2007 | Tran | |
| 2008/0005282 A1 | 1/2008 | Gaedcke | |
| 2008/0005669 A1 | 1/2008 | Eilertsen et al. | |
| 2008/0021829 A1 | 1/2008 | Kranzley | |
| 2008/0027798 A1 | 1/2008 | Ramamurthi et al. | |
| 2008/0034295 A1 | 2/2008 | Kulas | |
| 2008/0040683 A1 | 2/2008 | Walsh | |
| 2008/0046406 A1 | 2/2008 | Seide et al. | |
| 2008/0077530 A1 | 3/2008 | Banas | |
| 2008/0081662 A1 | 4/2008 | Strandell et al. | |
| 2008/0086688 A1 | 4/2008 | Chandratillake | |
| 2008/0086689 A1 | 4/2008 | Berkley et al. | |
| 2008/0092054 A1 | 4/2008 | Bhumkar et al. | |
| 2008/0120278 A1 | 5/2008 | Roe et al. | |
| 2008/0120550 A1 | 5/2008 | Oakley | |
| 2008/0126191 A1 | 5/2008 | Schiavi | |
| 2008/0134018 A1 | 6/2008 | Kembel et al. | |
| 2008/0165960 A1* | 7/2008 | Woo | 380/201 |
| 2008/0195477 A1 | 8/2008 | Kennedy | |
| 2008/0195962 A1 | 8/2008 | Lin et al. | |
| 2008/0205694 A1 | 8/2008 | Sagoo et al. | |
| 2008/0215680 A1 | 9/2008 | Salesky et al. | |
| 2008/0215985 A1* | 9/2008 | Batchelder | G06F 17/248 715/731 |
| 2008/0222538 A1 | 9/2008 | Cardu | |
| 2008/0222560 A1 | 9/2008 | Harrison | |
| 2008/0244740 A1 | 10/2008 | Hicks et al. | |
| 2008/0270905 A1 | 10/2008 | Goldman | |
| 2008/0276279 A1* | 11/2008 | Gossweiler et al. | 725/46 |
| 2008/0288460 A1 | 11/2008 | Poniatowski et al. | |
| 2008/0301546 A1 | 12/2008 | Moore et al. | |
| 2008/0306995 A1 | 12/2008 | Newell et al. | |
| 2009/0007023 A1 | 1/2009 | Sundstrom | |
| 2009/0037449 A1 | 2/2009 | Fagans et al. | |
| 2009/0083161 A1 | 3/2009 | Mital | |
| 2009/0087161 A1 | 4/2009 | Roberts et al. | |
| 2009/0119256 A1 | 5/2009 | Waters | |
| 2009/0132415 A1 | 5/2009 | Davis et al. | |
| 2009/0138320 A1 | 5/2009 | Schmidt et al. | |
| 2009/0177546 A1 | 7/2009 | Dijk et al. | |
| 2009/0182810 A1 | 7/2009 | Higgins et al. | |
| 2009/0210391 A1 | 8/2009 | Hall et al. | |
| 2009/0254515 A1 | 10/2009 | Terheggen et al. | |
| 2009/0271283 A1 | 10/2009 | Fosnacht et al. | |
| 2009/0276425 A1 | 11/2009 | Phillips et al. | |
| 2009/0292681 A1 | 11/2009 | Wood et al. | |
| 2009/0319530 A1* | 12/2009 | Hoertnagl | G06F 17/30887 |
| 2010/0004508 A1 | 1/2010 | Naito et al. | |
| 2010/0005066 A1 | 1/2010 | Howard et al. | |
| 2010/0005068 A1 | 1/2010 | Howard et al. | |
| 2010/0023849 A1 | 1/2010 | Hakim et al. | |
| 2010/0036812 A1 | 2/2010 | Choi et al. | |
| 2010/0042628 A1* | 2/2010 | Crowley | G06F 17/30194 707/783 |
| 2010/0083077 A1 | 4/2010 | Paulsen et al. | |
| 2010/0083303 A1* | 4/2010 | Redei et al. | 725/32 |
| 2010/0115410 A1* | 5/2010 | Fu et al. | 715/721 |
| 2010/0162375 A1* | 6/2010 | Tiu, Jr. | G06F 17/3089 726/7 |
| 2010/0281386 A1 | 11/2010 | Lyons et al. | |
| 2010/0325019 A1 | 12/2010 | Avery | |
| 2010/0332565 A1 | 12/2010 | Al-Shaykh et al. | |
| 2011/0022966 A1* | 1/2011 | Rose | G06F 17/3089 715/747 |
| 2011/0060979 A1 | 3/2011 | O'Brien-Strain | |
| 2011/0285748 A1 | 11/2011 | Slatter et al. | |
| 2012/0323743 A1* | 12/2012 | Chang | G06Q 30/0603 705/27.1 |
| 2013/0124996 A1 | 5/2013 | Margulis | |
| 2014/0108510 A1* | 4/2014 | Schwesig | H04N 21/437 709/203 |
| 2014/0108931 A1 | 4/2014 | Howard et al. | |
| 2015/0254212 A1 | 9/2015 | Lanahan et al. | |
| 2016/0170568 A1 | 6/2016 | Kontkanen et al. | |
| 2016/0371266 A1 | 12/2016 | Howard et al. | |
| 2017/0199847 A1 | 7/2017 | Lanahan et al. | |

(56) References Cited

U.S. PATENT DOCUMENTS

| | | | |
|---|---|---|---|
| 2017/0235450 | A1 | 8/2017 | Lanahan et al. |
| 2017/0235712 | A1 | 8/2017 | Lanahan et al. |
| 2018/0329870 | A1 | 11/2018 | Lanahan et al. |
| 2019/0339830 | A1 | 11/2019 | Lanahan et al. |
| 2020/0272787 | A1 | 8/2020 | Lanahan et al. |
| 2021/0081595 | A1 | 3/2021 | Lanahan et al. |

FOREIGN PATENT DOCUMENTS

| | | |
|---|---|---|
| WO | 2000/056055 | 9/2000 |
| WO | 2002/059799 A1 | 8/2002 |
| WO | 2010/003111 A1 | 1/2010 |
| WO | 2010/003121 A1 | 1/2010 |

OTHER PUBLICATIONS

U.S. Appl. No. 14/722,030, Amendment and Response filed Sep. 19, 2017, 18 pages.
U.S. Appl. No. 14/722,030, Notice of Allowance dated Oct. 19, 2017, 9 pages.
U.S. Appl. No. 15/250,763, Office Action dated Aug. 31, 2017, 14 pages.
Retrieved from the Internet URL: <https://web.archive.org/web/20090731120449/http://blog.justswell.org/drag-and-drop-files-from-your-desktop-to-your-browser-using-javascript/>, Jul. 28, 2009, 5 pages.
Asterpix—SearchLight: Content Discovery Made Easy, http://www.asterpix.com/searchlightl, Feb. 14, 2011, 1 page.
Dorothy Burke, "How to use Lotus Notes 6", Mar. 4, 2003, 4 pages.
EBay the Chatter Check out the eBay to Go Widget, May 17, 2007, 3 pages.
EHow How to Create a clickable image map with Dreamweaver, Feb. 16, 2008, 2 pages.
Formatting Shapes and Objects, www.functionx.com/powerpoint/Lesson11.htm, Dec. 14, 2007, 8 pages.
Golden Nugget Screenshots, media.psx.ign.com/media/000/000295/imgs_1.html, Apr. 4, 2011, 2 pages.
Golden Nugget, www.absolute-playstation.com/api_review/rgnugg.htm, Apr. 4, 2011, 5 pages.
Google Operating System, Upload Files in a Browser Using Drag and Drop, http://googlesystems.blogspot.com/2007/02/upload-files-in-browser-using-drag-and.html, Feb. 23, 2007, 1 page.
Guns Hansen's Exclusive Poker Tips Video #1, www.dailymotion.com/video/x3op2y_gus-hansens-exclusive-poker-tips-vi_videogames, Dec. 6, 2007, 2 pages.
Josh Lowensohn, CNET eBay does MySpace-compatible widgets, May 1, 2007, 3 pages.
Looks Good Works Well by Bill Scotts, Musings on Rich Web Design and User Interface Engineering, http://looksgoodworkswell.golgspot.com/2006/03/maind-hacking-visual-transi_11437691330, Apr. 4, 2011, 7 pages.
Michael Arrington, eBay Launches "togo" Widgets for any listing, Apr. 30, 2007, 2 pages.
Microsoft FrontPage 2003 Image Maps: Creating Hotspots, Sep. 29, 2004, 5 pages.
Naj My Depictions Ebay to Go—New Widget to Display Listing, May 22, 2007, 3 pages.
PCT International Preliminary Report on Patentability in PCT/US2009/049606, dated Jan. 5, 2011, 5 pages.
PCT International Preliminary Report on Patentability in PCT/US2009/49622, dated Jan. 5, 2011, 5 pages.
PCT International Search Report and Written Opinion in PCT/US2009/049606, dated Aug. 14, 2009, 6 pages.
PCT International Search Report and Written Opinion in PCT/US2009/49622, dated Aug. 14, 2009, 6 pages.
Shelly Brisbin, "Clickable Image Maps in Adobe GoLive", Mar. 30, 2001, 3 pages.
U.S. Appl. No. 12/347,638, Advisory Action dated Dec. 7, 2016, 3 pages.
U.S. Appl. No. 12/347,638, Amendment and Response filed Dec. 5, 2011, 10 pages.
U.S. Appl. No. 12/347,638, Amendment and Response filed Jul. 11, 2012, 11 pages.
U.S. Appl. No. 12/347,638, Amendment and Response filed Jan. 24, 2013, 11 pages.
U.S. Appl. No. 12/347,638, Amendment and Response filed Aug. 20, 2013, 11 pages.
U.S. Appl. No. 12/347,638, Amendment and Response filed Jan. 3, 2014, 12 pages.
U.S. Appl. No. 12/347,638, Amendment and Response filed Jul. 25, 2014, 14 pages.
U.S. Appl. No. 12/347,638, Amendment and Response filed Apr. 29, 2015, 12 pages.
U.S. Appl. No. 12/347,638, Amendment and Response filed Nov. 17, 2015, 11 pages.
U.S. Appl. No. 12/347,638, Amendment and Response filed Jun. 21, 2016, 11 pages.
U.S. Appl. No. 12/347,638, Amendment and Response filed Nov. 28, 2016, 13 pages.
U.S. Appl. No. 12/347,638, Notice of Allowance dated Dec. 30, 2016, 5 pages.
U.S. Appl. No. 12/347,638, Office Action dated Sep. 8, 2011, 10 pages.
U.S. Appl. No. 12/347,638, Office Action dated Apr. 19, 2012, 11 pages.
U.S. Appl. No. 12/347,638, Office Action dated Oct. 26, 2012, 12 pages.
U.S. Appl. No. 12/347,638, Office Action dated May 21, 2013, 11 pages.
U.S. Appl. No. 12/347,638, Office Action dated Oct. 4, 2013, 12 pages.
U.S. Appl. No. 12/347,638, Office Action dated Apr. 25, 2014, 12 pages.
U.S. Appl. No. 12/347,638, Office Action dated Feb. 10, 2015, 15 pages.
U.S. Appl. No. 12/347,638, Office Action dated Aug. 17, 2015, 15 pages.
U.S. Appl. No. 12/347,638, Office Action dated Jan. 15, 2016, 16 pages.
U.S. Appl. No. 12/347,638, Office Action dated Sep. 26, 2016, 15 pages.
U.S. Appl. No. 12/347,749, Amendment and Response filed Jun. 22, 2011, 9 pages.
U.S. Appl. No. 12/347,749, Amendment and Response filed Dec. 2, 2011, 9 pages.
U.S. Appl. No. 12/347,749, Amendment and Response filed Mar. 23, 2012, 10 pages.
U.S. Appl. No. 12/347,749, Amendment and Response filed Oct. 4, 2012, 13 pages.
U.S. Appl. No. 12/347,749, Amendment and Response filed May 7, 2013, 13 pages.
U.S. Appl. No. 12/347,749, Notice of Allowance dated Aug. 28, 2013, 11 pages.
U.S. Appl. No. 12/347,749, Office Action dated Mar. 24, 2011, 8 pages.
U.S. Appl. No. 12/347,749, Office Action dated Sep. 2, 2011, 7 pages.
U.S. Appl. No. 12/347,749, Office Action dated Dec. 23, 2011, 9 pages.
U.S. Appl. No. 12/347,749, Office Action dated Jul. 17, 2012, 10 pages.
U.S. Appl. No. 12/347,749, Office Action dated Feb. 13, 2013, 13 pages.
U.S. Appl. No. 12/347,829, Amendment and Response filed Dec. 29, 2011, 13 pages.
U.S. Appl. No. 12/347,829, Amendment and Response filed Sep. 12, 2012, 13 pages.
U.S. Appl. No. 12/347,829, Notice of Allowance dated Sep. 27, 2012, 8 pages.
U.S. Appl. No. 12/347,829, Office Action dated Oct. 5, 2011, 12 pages.

(56) References Cited

OTHER PUBLICATIONS

U.S. Appl. No. 12/347,829, Office Action dated Jun. 14, 2012, 12 pages.
U.S. Appl. No. 12/495,438, Amendment and Response filed Sep. 20, 2011, 11 pages.
U.S. Appl. No. 12/495,438, Amendment and Response filed Feb. 10, 2012, 12 pages.
U.S. Appl. No. 12/495,438, Amendment and Response filed Sep. 21, 2012, 12 pages.
U.S. Appl. No. 12/495,438, Amendment and Response filed Apr. 3, 2013, 12 pages.
U.S. Appl. No. 12/495,438, Notice of Allowance dated Jun. 11, 2013, 16 pages.
U.S. Appl. No. 12/495,438, Office Action dated Jun. 20, 2011, 15 pages.
U.S. Appl. No. 12/495,438, Office Action dated Nov. 21, 2011, 15 pages.
U.S. Appl. No. 12/495,438, Office Action dated Jun. 21, 2012, 13 pages.
U.S. Appl. No. 12/495,438, Office Action dated Jan. 3, 2013, 15 pages.
U.S. Appl. No. 12/495,493, Amendment and Response filed Nov. 1, 2011, 11 pages.
U.S. Appl. No. 12/495,493, Amendment and Response filed Mar. 23, 2012, 10 pages.
U.S. Appl. No. 12/495,493, Notice of Allowance dated Aug. 26, 2013, 12 pages.
U.S. Appl. No. 12/495,493, Office Action dated Aug. 2, 2011, 18 pages.
U.S. Appl. No. 12/495,493, Office Action dated Dec. 28, 2011, 18 pages.
U.S. Appl. No. 12/495,520, Amendment and Response filed Jun. 1, 2011, 9 pages.
U.S. Appl. No. 12/495,520, Amendment and Response filed Jan. 11, 2012, 12 pages.
U.S. Appl. No. 12/495,520, Amendment and Response filed Jan. 22, 2013, 12 pages.
U.S. Appl. No. 12/495,520, Amendment and Response filed Jul. 1, 2013, 13 pages.
U.S. Appl. No. 12/495,520, Amendment and Response filed Oct. 22, 2013, 14 pages.
U.S. Appl. No. 12/495,520, Amendment and Response filed Apr. 16, 2014, 18 pages.
U.S. Appl. No. 12/495,520, Amendment and Response filed Jul. 22, 2014, 18 pages.
U.S. Appl. No. 12/495,520, Amendment and Response filed Dec. 16, 2014, 15 pages.
U.S. Appl. No. 12/495,520, Amendment and Response filed Dec. 10, 2015, 20 pages.
U.S. Appl. No. 12/495,520, Notice of Allowance dated Apr. 25, 2016, 8 pages.
U.S. Appl. No. 12/495,520, Office Action dated Mar. 3, 2011, 22 pages.
U.S. Appl. No. 12/495,520, Office Action dated Oct. 18, 2011, 29 pages.
U.S. Appl. No. 12/495,520, Office Action dated Oct. 24, 2012, 31 pages.
U.S. Appl. No. 12/495,520, Office Action dated Apr. 2, 2013, 33 pages.
U.S. Appl. No. 12/495,520, Office Action dated Jul. 22, 2013, 34 pages.
U.S. Appl. No. 12/495,520, Office Action dated Jan. 16, 2014, 34 pages.
U.S. Appl. No. 12/495,520, Office Action dated Apr. 22, 2014, 35 pages.
U.S. Appl. No. 12/495,520, Office Action dated Sep. 16, 2014, 34 pages.
U.S. Appl. No. 12/495,520, Office Action dated Sep. 10, 2015, 39 pages.
U.S. Appl. No. 12/495,684, Amendment and Response filed Feb. 8, 2012, 11 pages.
U.S. Appl. No. 12/495,684, Amendment and Response filed Jul. 6, 2012, 10 pages.
U.S. Appl. No. 12/495,684, Amendment and Response filed Feb. 28, 2014, 11 pages.
U.S. Appl. No. 12/495,684, Notice of Allowance dated Jul. 7, 2014, 15 pages.
U.S. Appl. No. 12/495,684, Office Action dated Nov. 15, 2011, 12 pages.
U.S. Appl. No. 12/495,684, Office Action dated Apr. 10, 2012, 16 pages.
U.S. Appl. No. 12/495,684, Office Action dated Dec. 2, 2013, 14 pages.
U.S. Appl. No. 12/495,718, Amendment and Response filed Feb. 10, 2012, 13 pages.
U.S. Appl. No. 12/495,718, Amendment and Response filed May 22, 2012, 18 pages.
U.S. Appl. No. 12/495,718, Amendment and Response filed Sep. 24, 2013, 12 pages.
U.S. Appl. No. 12/495,718, Amendment and Response filed Mar. 31, 2014, 12 pages.
U.S. Appl. No. 12/495,718, Amendment and Response filed Dec. 30, 2014, 15 pages.
U.S. Appl. No. 12/495,718, Notice of Allowance dated Jan. 26, 2015, 12 pages.
U.S. Appl. No. 12/495,718, Office Action dated Nov. 15, 2011, 10 pages.
U.S. Appl. No. 12/495,718, Office Action dated Feb. 27, 2012, 11 pages.
U.S. Appl. No. 12/495,718, Office Action dated Jun. 28, 2013, 10 pages.
U.S. Appl. No. 12/495,718, Office Action dated Dec. 30, 2013, 11 pages.
U.S. Appl. No. 12/495,718, Office Action dated Sep. 30, 2014, 10 pages.
U.S. Appl. No. 12/495,748, Amendment and Response filed Feb. 7, 2012, 13 pages.
U.S. Appl. No. 12/495,748, Amendment and Response filed Jul. 11, 2012, 12 pages.
U.S. Appl. No. 12/495,748, Notice of Allowance dated Jul. 18, 2012, 6 pages.
U.S. Appl. No. 12/495,748, Office Action dated Nov. 8, 2011, 8 pages.
U.S. Appl. No. 12/495,748, Office Action dated Apr. 17, 2012, 5 pages.
U.S. Appl. No. 12/495,756, Amendment and Response filed May 2, 2011, 12 pages.
U.S. Appl. No. 12/495,756, Notice of Allowance dated Jun. 15, 2011, 9 pages.
U.S. Appl. No. 12/495,756, Office Action dated Feb. 2, 2011, 15 pages.
U.S. Appl. No. 14/144,199, Advisory Action dated Dec. 30, 2016, 5 pages.
U.S. Appl. No. 14/144,199, Amendment and Response filed Jun. 10, 2016, 12 pages.
U.S. Appl. No. 14/144,199, Amendment and Response filed Nov. 16, 2016, 9 pages.
U.S. Appl. No. 14/144,199, Amendment and Response filed Jan. 17, 2017, 13 pages.
U.S. Appl. No. 14/144,199, Office Action dated Mar. 10, 2016, 44 pages.
U.S. Appl. No. 14/144,199, Office Action dated Sep. 22, 2016, 14 pages.
U.S. Appl. No. 14/144,199, Office Action dated Apr. 4, 2017, 14 pages.
U.S. Appl. No. 14/149,140, Amendment and Response filed Jun. 24, 2016, 13 pages.
U.S. Appl. No. 14/149,140, Notice of Allowance dated Nov. 18, 2016, 8 pages.
U.S. Appl. No. 14/149,140, Office Action dated Mar. 24, 2016, 18 pages.

(56) References Cited

OTHER PUBLICATIONS

U.S. Appl. No. 14/149,140, Office Action dated Oct. 20, 2016, 13 pages.
U.S. Appl. No. 14/547,083, 312 Amendment filed Apr. 12, 2017, 3 pages.
U.S. Appl. No. 14/547,083, Amendment and Response filed Jul. 20, 2016, 11 pages.
U.S. Appl. No. 14/547,083, Amendment and Response filed Dec. 22, 2016, 12 pages.
U.S. Appl. No. 14/547,083, Notice of Allowance dated Jan. 13, 2017, 9 pages.
U.S. Appl. No. 14/547,083, Office Action dated Apr. 20, 2016, 11 pages.
U.S. Appl. No. 14/547,083, Office Action dated Nov. 3, 2016, 13 pages.
U.S. Appl. No. 14/547,083, Response to 312 Amendment dated Apr. 27, 2017, 2 pages.
U.S. Appl. No. 15/250,763, Amendment and Response filed Apr. 13, 2017, 11 pages.
U.S. Appl. No. 15/250,763, Office Action dated Jan. 13, 2017, 16 pages.
U.S. Appl. No. 15/250,763, Office Action dated May 5, 2017, 13 pages.
Using Adobe Acrobat, Apr. 9, 2004, 17 pages.
Warner, "Dreamweaver CS3 for Dummies" May 7, 2007, 12 pages.
Wikipedia, "File Manager", https://en.wikipedia.org/wiki/File_manager, 7 pages.
World Poker Tour Deals Twelve Million Hands of WPT Texas Hold'Em and Receives Industry Accolades, Feb. 26, 2008, 4 pages, wireless.ign.com/articles/854/854954pl.htm.
WPT Mobile; World Poker Tour; wptmobile.handson.com/wpt_texas_hold_em_2.pho?performcheck=2, 2008, 1 page.
European Summons in Application 09774560.8, mailed May 3, 2017, 16 pages.
"Free Word 2003 Tutorial at GCFLeamFree", Jan. 1, 2003, http://www.gcfleamfree.org/word2003/insterting-hyperlinnks/1, 2 pages.
Taylor, "Crystal Reports 10: Adding a Hyperlink to a Report" In Crystal reports 10 for Dummies, Jun. 1, 2004, 6 pages.
U.S. Appl. No. 14/144,199, Amendment and Response filed Aug. 4, 2017, 11 pages.
U.S. Appl. No. 14/722,030, Office Action dated Jun. 19, 2017, 11 pages.
U.S. Appl. No. 15/250,763, Amendment and Response filed Aug. 7, 2017, 11 pages.
U.S. Appl. No. 14/144,199, Notice of Allowance dated Nov. 17, 2017, 8 pages.
U.S. Appl. No. 15/250,763, Amendment and Response filed Nov. 30, 2017, 9 pages.
Communication Pursuant to Article 94(3) EPC received for European Patent Application No. 09774560.8, dated Nov. 10, 2014, 7 pages.
Extended European Search report received for European Patent Application No. 09774560.8, dated Jun. 26, 2013, 6 pages.
Response to Communication Pursuant to Article 94(3) EPC filed on Mar. 20, 2015, for European Patent Application No. 09774560.8, dated Nov. 10, 2014, 2 pages.
Response to Extended European Search report filed on Jan. 9, 2014, for European Patent Application No. 09774560.8, dated Jun. 26, 2013, 12 pages.
Communication Pursuant to Article 94(3) EPC received for European Patent Application No. 09774570.7, dated Sep. 16, 2013, 5 pages.
Response to Communication pursuant to Rules 94(3) EPC filed on Jan. 27, 2014, for European Patent Application No. 09774570.7, dated Sep. 16, 2013, 10 pages.
Preliminary Amendment filed for U.S. Appl. No. 15/584,993, dated May 2, 2017, 7 pages.
Extended European Search report received for European Patent Application No. 09774570.7, dated Nov. 22, 2011, 8 pages.
Supplemental Notice of Allowance received for U.S. Appl. No. 12/495,756, dated Jul. 19, 2011, 3 pages.
Applicant Initiated Interview Summary Received for U.S. Appl. No. 14/144,199 dated Apr. 4, 2018, 3 pages.
Non-Final Office Action received for U.S. Appl. No. 14/144,199, dated Mar. 14, 2018, 8 pages.
Response to Non-Final Office Action filed on Apr. 5, 2018, for U.S. Appl. No. 14/144,199, dated Mar. 14, 2018, 20 pages.
Notice of Allowance received for U.S. Appl. No. 14/722,030, dated Feb. 27, 2018, 7 pages.
Response to Notice of Allowance filed on Jan. 19, 2018, for U.S. Appl. No. 14/722,030, dated Oct. 19, 2017, 7 pages.
Applicant Initiated Interview Summary Received for U.S. Appl. No. 15/250,763 dated Apr. 16, 2018, 3 pages.
Applicant Initiated Interview Summary received for U.S. Appl. No. 15/250,763 dated Dec. 4, 2017, 3 pages.
Final Office Action received for U.S. Appl. No. 15/250,763, dated Mar. 27, 2018, 12 pages.
Non-Final Office Action received for U.S. Appl. No. 15/452,474, dated Feb. 6, 2018, 13 pages.
Preliminary Amendment filed for U.S. Appl. No. 15/452,474, dated Jul. 5, 2017, 7 pages.
Preliminary Amendment filed for U.S. Appl. No. 15/583,704, dated May 1, 2017, 7 pages.
Response to Non-Final Office Action filed on Jun. 20, 2019 for U.S. Appl. No. 15/583,704, dated Apr. 1, 2019, 14 pages.
Applicant Initiated Interview Summary received for U.S. Appl. No. 12/347,638, dated Apr. 12, 2016, 3 pages.
Applicant Initiated Interview Summary received for U.S. Appl. No. 14/144,199, dated May 19, 2016, 3 pages.
Applicant-Initiated Interview Summary received for U.S. Appl. No. 14/144,199, dated Oct. 25, 2016, 3 pages.
Corrected Notice of Allowability Received for U.S. Appl. No. 14/144,199 dated Nov. 2, 2018, 3 pages.
Corrected Notice of Allowability received for U.S. Appl. No. 14/144,199, dated Nov. 19, 2018, 3 pages.
Examiner-Initiated Interview Summary received for U.S. Appl. No. 14/144,199, dated Nov. 17, 2017, 1 page.
Applicant Initiated Interview Summary received for U.S. Appl. No. 14/149,140, dated Jun. 17, 2016, 3 pages.
Applicant Initiated Interview Summary received for U.S. Appl. No. 14/547,083, dated Dec. 16, 2016, 3 pages.
Notice of Allowance received for U.S. Appl. No. 14/722,030, dated Jan. 23, 2019, 7 pages.
Final Office Action received for U.S. Appl. No. 15/250,763 , dated Apr. 12, 2019, 13 pages.
Response to Non-Final Office Action filed on Dec. 21, 2018, for U.S. Appl. No. 15/250,763 , dated Sep. 20, 2018, 21 pages.
Non-Final Office Action received for U.S. Appl. No. 15/452,474, dated Nov. 6, 2018, 11 pages.
Response to Final Office Action filed on Oct. 18, 2018, for U.S. Appl. No. 15/452,474, dated Jul. 16, 2018, 16 pages.
Response to Non-Final Office Action filed on Dec. 14, 2018, for U.S. Appl. No. 15/452,474 , dated Nov. 6, 2018, 10 pages.
Non-Final Office action received for U.S. Appl. No. 15/583,704, dated Apr. 1, 2019 15 pages.
Non-Final Office Action received for U.S. Appl. No. 15/584,993, dated Apr. 19, 2019, 12 pages.
ROXIO, "Photoshow", Retrieved from the Internet URL: <http://www.photoshow.com/home/start>, Accessed on May 21, 2019, 1 page.
Notice of Allowance received for U.S. Appl. No. 14/144,199, dated Aug. 7, 2018, 8 pages.
Notice of Allowance received for U.S. Appl. No. 14/722,030, dated Jun. 11, 2018, 7 pages.
Advisory Action received for U.S. Appl. No. 15/250,763, dated Jul. 5, 2018, 3 pages.
Response to Final Office Action filed on May 29, 2018, for U.S. Appl. No. 15/250,763, dated Mar. 27, 2018, 18 pages.
Final Office Action received for U.S. Appl. No. 15/452,474, dated Jul. 16, 2018, 16 pages.
Response to Non-Final Office Action filed May 4, 2018, for U.S. Appl. No. 15/452,474, dated Feb. 6, 2018, 10 pages.

(56) References Cited

OTHER PUBLICATIONS

Non-Final Office Action received for U.S. Appl. No. 15/250,763, dated Sep. 20, 2018, 12 pages.
Corrected Notice of Allowability received for U.S. Appl. No. 14/144,199, dated Sep. 14, 2018, 3 pages.
Examiner Interview Summary received for U.S. Appl. No. 14/144,199, dated Aug. 7, 2018, 1 page.
Applicant-Initiated Interview Summary received for U.S. Appl. No. 15/250,763, dated Oct. 2, 2018, 4 pages.
Preliminary Amendment filed for U.S. Appl. No. 15/250,763, dated Sep. 6, 2016, 8 pages.
Notice of Allowance received for U.S. Appl. No. 15/583,704, dated Feb. 20, 2020, 5 pages.
Notice of Non-Compliant Amendment received for U.S. Appl. No. 15/583,704, dated Oct. 21, 2019, 3 pages.
Response to Non-Final Office Action and Notice of Non-Compliant Amendment filed on Nov. 6, 2019, for U.S. Appl. No. 15/583,704, dated Oct. 21, 2019 and Apr. 1, 2019, 14 pages.
Corrected Notice of Allowability Received for U.S. Appl. No. 15/583,704, dated May 29, 2020, 2 pages.
Notice of Allowability Received for U.S. Appl. No. 15/583,704, dated Mar. 31, 2020, 2 pages.
Response to Rule 312 Communication Received for U.S. Appl. No. 15/583,704, dated May 14, 2020, 2 pages.
Non Final Office Action Received for U.S. Appl. No. 16/046,547, dated Mar. 20, 2020, 9 pages.
Notice of Allowance received for U.S. Appl. No. 15/583,704, dated Mar. 31, 2020, 2 pages.
Applicant-Initiated Interview Summary received for U.S. Appl. No. 12/495,684, dated Feb. 28, 2014, 3 pages.
Final Office Action Received for U.S. Appl. No. 15/452,474, dated Jun. 23, 2020, 20 pages.
Final Office Action received for U.S. Appl. No. 15/452,474, dated Mar. 22, 2019, 14 pages.
Final Office Action Received for U.S. Appl. No. 15/452,474, dated Oct. 3, 2019, 15 pages.
Non Final Office Action Received for U.S. Appl. No. 15/452,474, dated Jan. 30, 2020, 16 pages.
Non-Final Office Action received for U.S. Appl. No. 15/452,474, dated Jul. 18, 2019, 14 pages.
Response to Final Office Action filed on Dec. 13, 2019 for U.S. Appl. No. 15/452,474, dated Oct. 3, 2019, 15 Pages.
Response to Final Office Action filed on Jun. 20, 2019 for U.S. Appl. No. 15/452,474, dated Mar. 22, 2019, 13 pages.
Response to Non-Final Office Action filed on Apr. 30, 2020 for U.S. Appl. No. 15/452,474, dated Jan. 30, 2020, 13 pages.
Response to Non-Final Office Action Filed on Aug. 22, 2019, for U.S. Appl. No. 15/452,474 dated Jul. 18, 2019, 13 pages.
Applicant Initiated Interview Summary Received for U.S. Appl. No. 16/046,547, dated Jun. 5, 2020, 3 Pages.
Notice of Allowance received for U.S. Appl. No. 16/046,5476, dated Jul. 16, 2020, 7 pages.
Response to Non-Final Office Action Filed on Jun. 19, 2020, for U.S. Appl. No. 16/046,547, dated Mar. 20, 2020, 17 pages.
Applicant Initiated Interview Summary Received for U.S. Appl. No. 16/511,499, dated Aug. 25, 2020, 3 Pages.
Non Final Office Action Received for U.S. Appl. No. 16/511,499, dated Jun. 11, 2020, 14 pages.
Response to Non-Final Office Action filed on Aug. 24, 2020 for U.S. Appl. No. 16/511,499, dated Jun. 11, 2020, 12 pages.
Non Final Office Action Received for U.S. Appl. No. 15/452,474, dated Dec. 28, 2020, 14 pages.
Non Final Office Action Received for U.S. Appl. No. 15/930,146, dated Dec. 22, 2020, 12 pages.
Final Office Action Received for U.S. Appl. No. 16/511,499, dated Dec. 4, 2020, 16 pages.
Catone, "Create Photo Books with Panraven", readwrite.com, retrieved from https://readwrite.com/2007/07/30/create_photobooks_with_panraven/. Jul. 30, 2007, 3 Pages.
Notice of Allowance Received for U.S. Appl. No. 15/452,474, dated Apr. 2, 2021, 9 Pages.
Final Office Action received for U.S. Appl. No. 15/930,146, dated Mar. 15, 2021, 15 pages.
Non Final Office Action Received for U.S. Appl. No. 16/511,499, dated Feb. 18, 2021, 14 Pages.
Yahoo!, "Groups—Groups Messages Help, Collection of Help pages for Yahoo", Groups as captured by Internet Archive Wayback Machine in Feb. of 2006, originally available at http://help.yahoo.com/help/us/groups/index.html. (Year: 2006), 2006, 9 Pages.

\* cited by examiner

SYSTEMS AND METHODS FOR PUBLISHING AND/OR SHARING MEDIA PRESENTATIONS OVER A NETWORK

CROSS-REFERENCE TO RELATED APPLICATIONS

This application is related to U.S. Provisional Patent Application No. 61/078,288, filed Jul. 3, 2008, entitled, "Multi-Media Online Presentation System and Method," which is incorporated herein by reference in its entirety.

BACKGROUND

Technical Field

The present invention generally relates to network-based multi-media presentations and more particularly to publishing and/or sharing media presentations over a network.

Related Art

Presently, in reference to creating and posting online media presentations, a user must typically purchase conventional media presentation software, which may be expensive, create a media presentation with the conventional media presentation software, which is often time consuming, upload the file for the media presentation, and then post a link to a file for online access to the created media presentation, which may require security features. To view the media presentation, another user must access the site storing the file, pass some form of access security features, download the file from the communication network, and have the same software that created the file for viewing. However, this sequence of creating and downloading the media presentation is often expensive, time-consuming, and inconvenient for each user involved in the process. As such, there exists a need to simplify the process of creating and viewing online media presentations over a communication network.

SUMMARY

In accordance with one or more embodiments of the present disclosure, a system for publishing and/or sharing media presentations over a network comprises a service component adapted to interface with a user over the network and one or more distribution channels over the network, a collect module adapted to gather media resources based on user input, a create module adapted to create a media presentation with the media resources based on user input, and a publish module adapted to distribute the media presentation to the one or more distribution channels via the network.

In one implementation, the publish module is adapted to directly email the media presentation to one or more other users via the network. In another implementation, the publish module is adapted to provide a link to one or more other users via the network for direct access to the media presentation. In still another implementation, the publish module is adapted to obtain and embed source code for the media presentation in a web page associated with one or more of the distribution channels via the network.

In accordance with another embodiment of the present disclosure, a method for publishing and/or sharing media presentations over a network comprises communicating with a user and one or more distribution channels via the network, gathering media resources based on user input, creating a media presentation with the media resources based on user input, and publishing the media presentation by distributing the media presentation to the one or more distribution channels via the network. In various implementations, publishing may comprise directly emailing the media presentation to one or more other users via the network, providing a link to one or more other users via the network for direct access to the media presentation, and/or embedding source code for the media presentation in a web page associated with one or more of the distribution channels via the network.

These and other features and advantages of the present disclosure will be more readily apparent from the detailed description of the embodiments set forth below taken in conjunction with the accompanying drawings.

Figure 1:
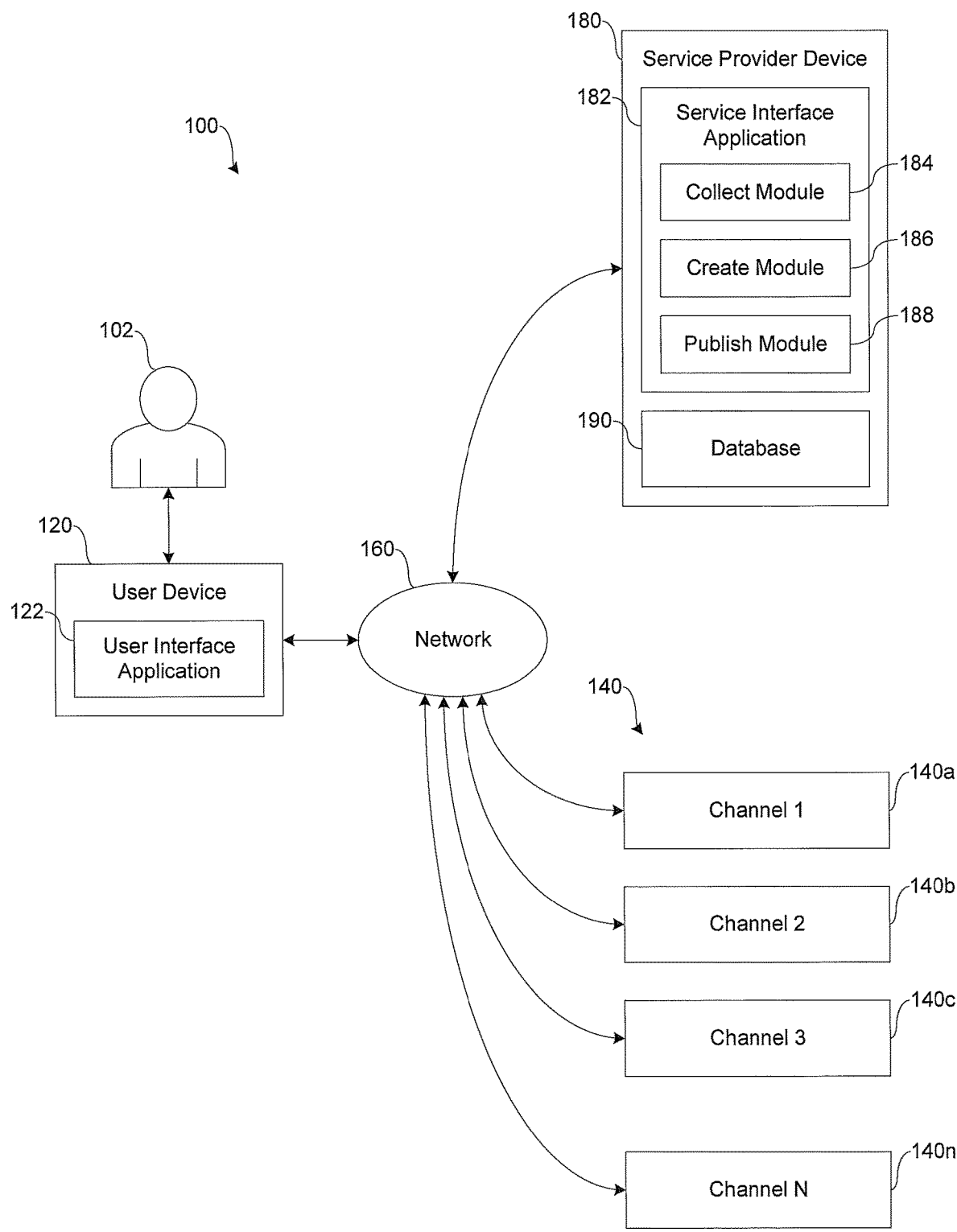
FIG. 1 shows a block diagram of a system configured to facilitate publishing and/or sharing media presentations over a network, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods disclosed herein, in accordance with one or more embodiments, facilitate publishing, sharing and/or broadcasting multi-media presentations over a network for viewing by other users in communication with the network. In one embodiment, the multi-media presentation may be published or distributed to a site accessible via the network for viewing by one or more other network users in communication with the network. In another embodiment, the multi-media presentation may be directly emailed to one or more recipients (i.e., other network users). In still another embodiment, an associated URL link for the multi-media presentation may be given (e.g., via email or some type of text message) to one or more recipients (i.e., other network users) for direct access to the multi-media presentation. In yet another embodiment, source code for the multi-media presentation may be embedded in a web page via the network.

FIG. 1 shows one embodiment of a block diagram of a system 100 adapted to facilitate publishing, sharing and/or broadcasting multi-media presentations over a network 160. As shown in FIG. 1, the system 100 includes at least one client device 120 (e.g., network computing device), one or more multi-media distribution channels 140 (e.g., network server devices), and at least one service provider device 180 (e.g., network server device) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

The at least one client device 120, in various embodiments, may be implemented using any appropriate combination of hardware and/or software configured for wired and/or wireless communication over the network 160. In various implementations, the client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

The client device 120, in one embodiment, includes a user interface application 122, which may be utilized by a user 102 to conduct information transactions with the distribution channels 140 and the service provider server 180 over the network 160. For example, the user interface application 122 may be implemented as a multi-media presentation application to collect, create and publish information via the network 160. In various implementations, multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, each member of the user group 102 is able to access multi-media websites via the one or more multi-media channels 140 to view, collect and publish multi-media presentations over the network 160.

The client device 120, in various embodiments, may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120, in various embodiments, may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing and/or sharing of a multi-media presentation.

The multi-media distribution channels 140, in one embodiment, may be maintained by one or more resource providers and/or entities (e.g., social networking sites, resource information sites, management sites, merchant sites, etc.) in communication with the network 160. As such, the multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

The service provider server 180, in one embodiment, may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160. As shown in FIG. 1, the service provider server 180 includes a service interface application 182, which may be adapted to interact with the client device 120 to facilitate publishing and/or sharing multi-media presentations over a network. In one example, the service provider server 180 may be provided and implemented by PayPal, Inc. of San Jose, Calif., USA.

The service application 182, in one embodiment, utilizes a collect module 184, a create module 186, and a publish module 188 to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into other user's webpages. Still other examples include the ability to publish multi-media presentations on a website to sell a particular item or service for purchase. For items and/or services, a media rich presentation helps users market and sell items and/or services, which may be valuable for high-end or high-priced items and/or services. Social and/or dating sites may utilize these multi-media presentations to provide online users with a way to better present themselves to other online users. In various implementations, some types of webpages may be presented in a more dynamic manner by utilizing Rich Site Summary (RSS) feeds, since, for example, a particular user's presentation may be continually changing with new media.

The service provider server 180, in various embodiments, may be configured to maintain, store and/or archive multimedia presentations in a database 190, each of which may include information related to one or more users, such as the user 102, and one or more multi-media channels, such as multi-media distributions channels 140. In various examples, the multi-media presentations may include attributes stored as part thereof, and the attributes may be passed to the service provider server 180 as part of a creating, publishing and/or sharing the multi-media presentations.

Referring to FIG. 1, the collect module 184, in one embodiment, enables the user 102 to collect audio, photographic images, video, and music media from various sources, such as a PC, RSS feeds, websites, and any other online source, via a user interface, such as the user interface application 122. In various implementations, the user interface application 122 comprises multiple tabs and/or links for the various sources. Once collected, the media may be saved and categorized in the database 190 and edited on the system site via the service provider server 180. Editing may include one or more of sizing, rotating, overlying, moving and stacking various media backward and forward with an overlay or stack. Video may be broken Up automatically by the service provider server 180 into smaller segments. Selected video segments may be combined and/or used as desired. Selected media may be placed on a virtual storyboard, such as a clipboard, on the same screen as the collection of media. Media may be edited either in the collection or in the storyboard. Placing desired media on the storyboard may be accomplished by dragging and dropping. In one example, the collect module 184 provides selected media on a storyboard. In another example, the collect module 184 provides media on a user's media page (i.e., not placed on the storyboard). In still another example, uploading media may be delayed until editing is completed.

Referring to FIG. 1, the create module 186, in one embodiment, enables the user 102 to place selected media onto a presentation style, board or collage. The service provider server 180 may automatically suggest a story idea to launch the creative process, or the user 102 may select a specific style or presentation tool. In one implementation, media from the storyboard may be dragged and dropped onto the presentation. Within the presentation, there may be multiple styles, such as a picture frame, a television, a billboard, etc. Media may be placed within the viewing window of each type of style. Once in the presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. In one aspect, the editing may be achieved in real-time so that the user 102 may quickly and easily see the results and change them as needed.

Referring to FIG. 1, the publish module 188, in one embodiment, enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

These modules 184, 186, 188 may be combined, used, and/or modified to provide the user 102 with different initial choices regarding the type of presentation and features desired for creating the presentation. The choices may be a simple, easy to use tool to quickly build presentations with dynamic content from RSS feeds and online albums. Accordingly, the user 102 may select a presentation style and then link it to the user's media libraries through RSS feeds that maintain an "always on" permalink to the content source.

Figure 2A:
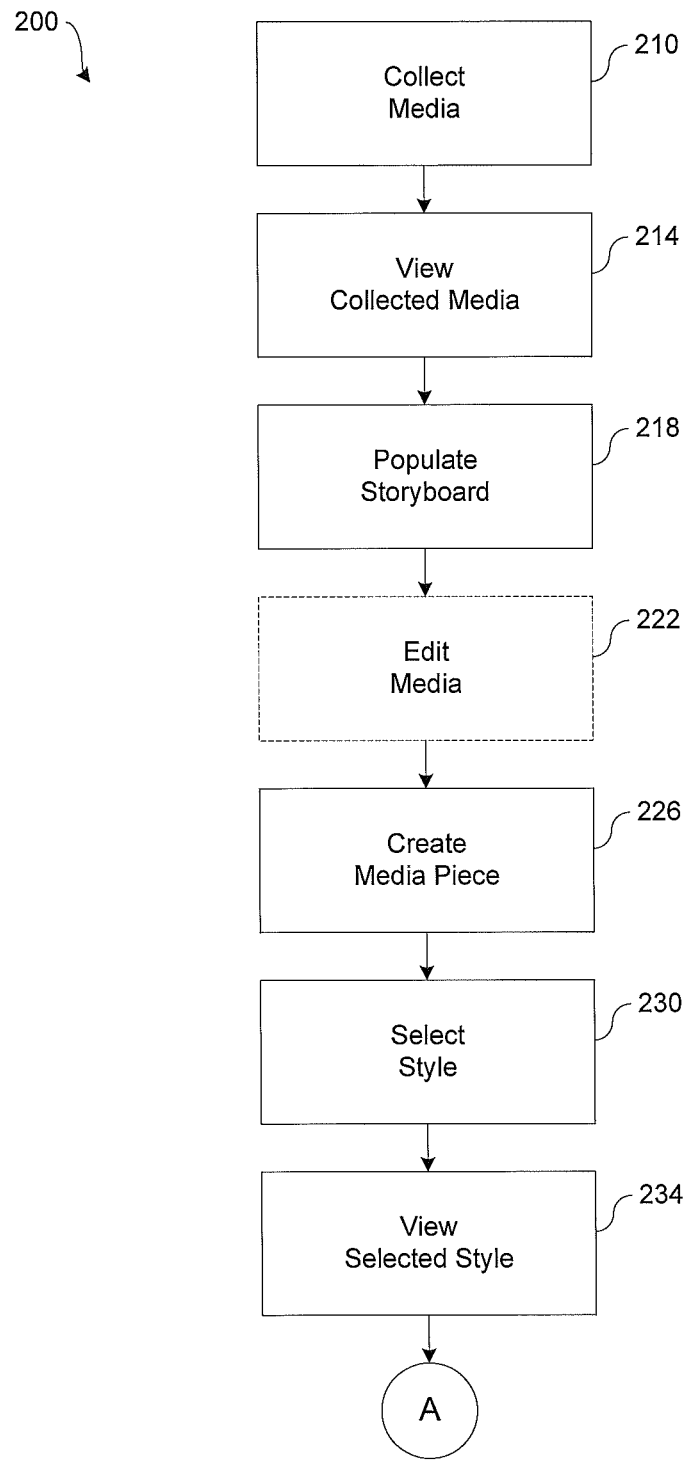
FIGS. 2A-2B show a block diagram of a method adapted to facilitate publishing and/or sharing multi-media presentations over a network, in accordance with an embodiment of the present disclosure.
Figure 2B:
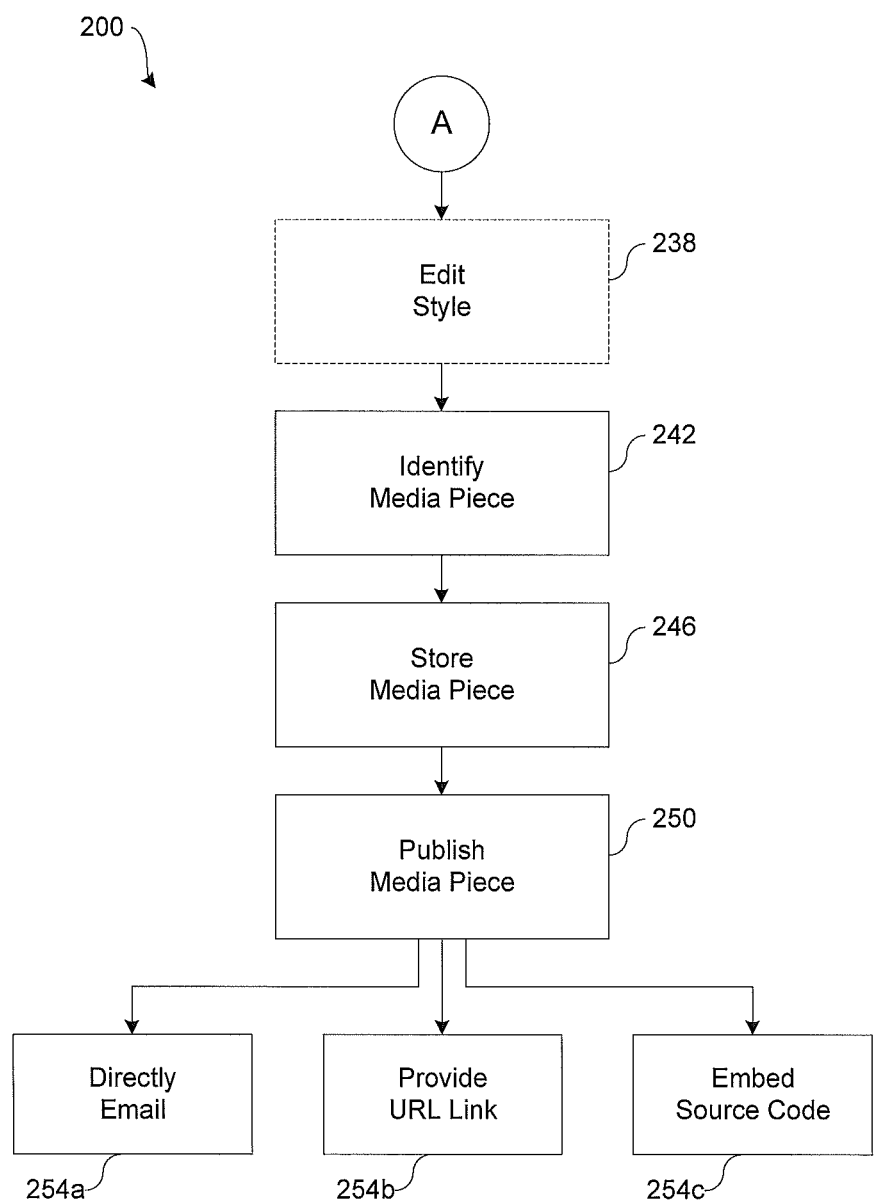

FIGS. 2A-2B show one embodiment of a block diagram of a method 200 adapted to facilitate publishing and/or sharing multi-media presentations over the network 160, in reference to FIG. 1. It should be appreciated that the order of the following process flow may be rearranged without departing from the scope of the present disclosure.

Referring to FIG. 2A, the method 200 comprises collecting media for a multi-media presentation (block 210). In various implementations, media such as photographic images, audio, video, music, etc. may be collected from a variety of sources including local sources, such as a personal computer (PC), and online sources, such as the Internet, for use in the media presentation or media piece. For example, an online search engine may be accessed and one or more keyword searches may be utilized to search the Internet for various types of media content. In another example, additional media may be collected from other sources, such as media from a PC, which may be selected, uploaded and viewed. As such, media from different sources may be viewed by selecting corresponding media source tabs from the user interface application 122. Media may be viewed as individual media items or clustered such that each of the individual media items within the cluster may be viewed. In one aspect, the user interface application 122 interfaces with the service interface application 182 via the network 160 to utilize the collect module 186 for collecting media. In another aspect, any media collected may be displayed on the user device 120 via the network 160 for viewing by the user 102 in a media collection area of the user interface application 122 (block 214).

Next, the method 200 comprises populating a storyboard (block 218). In one implementation, the user interface application 122 includes a graphical storyboard, which may be populated with collected media from one or more of the media items or a cluster of media items collected from various media sources. For example, the graphical storyboard may include one or more images of items and/or clustered items collected from the Internet and items uploaded from a PC.

Next, optionally, one or more of the media items may be edited (block 222). In various implementations, media positioned on the graphical storyboard may be edited prior to generating the media presentation or media piece, and/or individual media items in a media cluster may be reordered.

Next, the media presentation or media piece may be created (block 226). In one implementation, once media items have been collected and optionally edited, the media presentation or media piece may be created by selecting a creation operation of the user interface application 122. In one aspect, the user interface application 122 interfaces with the service interface application 182 via the network 160 to utilize the create module 186 for creating the media presentation or media piece.

In various implementations, creating the media presentation and/or media piece may include selecting and/or customizing its style (block 230) and viewing the selected and/or customized style (block 234). For example, presentation styles may include, but are not limited to, a picture frame, billboard, kaleidoscope, street scene, landscape, etc. Once a style is selected, media items from the storyboard may automatically flow into or populate the selected style. Some styles, such as kaleidoscope style, support movement of media as part of a presentation style and provides various customizable characteristics of movement, such as speed of media rotation, etc., within the style. In one aspect, the customized style may be displayed on the user device 120 via the network 160 for viewing by the user 102.

Next, referring to FIG. 2B, the selected and/or customized style of the media presentation or media piece may be optionally edited (block 238). In various implementations, if further editing of media presentation style is desired, style editing tools may be provided to the user interface application 122 via the create module 186. These editing tools may include the ability to preview the media presentation or media piece, edit the media presentation or media piece (e.g., scale, rotate and/or move frames directly onto the media presentation or media piece), add text and/or captions to the media presentation or media piece, add audio, sound, music and/or voice-over to the media presentation or media piece, placement of a frame and/or masking of the media presentation or piece, and add background images and/or color to the media presentation or media piece. For example, a sound feature may provide options, such as adding music to particular media or background, having the music vary in loudness depending on time and/or spatial indicators, and having a repeating playlist that repeats particular music and/or plays different segments in a random manner.

Next, the method 200 comprises providing identifying information (block 242) about the media presentation or media piece (e.g., a title, storage location and/or various types of descriptive information) and deciding where to store the media presentation or media piece (block 246). In one implementation, the user 102 may identify and/or a select one or more distribution channels located on an associated server for storage of the media presentation or media piece or choose an alternative storage location in the network 160.

Next, the method 200 comprises publishing, sharing and/or broadcasting the media presentation or media piece via the network (block 250). In various implementations, the media presentation or media piece may be published or distributed to a site accessible via the network 160 for viewing by one or more other network users in communication with the network 160. For example, the media presentation or media piece may be directly emailed (block 254*a*) to one or more recipients (i.e., other network users), along with a message. In another example, an associated URL link (block 254*b*) for the media presentation or media piece may be given (e.g., via email or some type of text message) to one or more recipients (i.e., other network users) for direct access to the media presentation or media piece via the network 160. In still another example, source code (block 254*c*) for the media presentation or media piece may be obtained by the user 102 and embedded into a web page managed by the user 102 via the network 160.

Accordingly, in various implementations, the user 102 may email the media presentation or media piece to other network users via the network 160, embed the media presentation or media piece in a web page that is accessible via the network 160, and/or create a URL permalink of the media presentation or media piece to one or more of the multi-media distribution channels 140 in the network 160.

In one implementation, the service interface application 182 allows users to compose multi-media stories, presentations and pieces by laying out photographic images, video, text and audio on a stage, storyboard or collage. In one aspect, a multi-media story may begin from an unpopulated storyboard. The user 102 may select to view and work with a sample story until the user 102 is ready to begin the media story. Multi-media items from various sources may be viewed by selecting source tabs of the user interface application 122.

Once the user 102 is ready to create a media story, the user 102 accesses a collage storyboard. In one aspect, the storyboard or stage progressively moves in a first direction, such as a left or right direction, and when viewed, may appear as a movie adapted to present a linear narrative in time and/or space. In another aspect, the stage may progressively move in a second direction, such as upward or downward. As such, this may also be presented as a movie adapted to present a linear narrative in time and/or space. The vertical orientation may represent physical structures that have height and/or depth, such as buildings, structures, monuments and/or geological strata. In still another aspect, the stage may be adapted to progressively move in a plurality of directions and may be presented as real or virtual spaces in two or three dimensions.

In various implementations, multi-media items from various sources may be uploaded from the network 160, or previously collected media items may be used to populate the storyboard by selecting desired multi-media items. A multi-media item may be repositioned within the storyboard by dragging and dropping the multi-media item to another location in the storyboard. Similarly, a multi-media item may be removed from the storyboard by dragging and dropping the multi-media item from the storyboard. In one aspect, once multi-media items are positioned within the storyboard, the media story may be edited. In this regard, a rich interface may be presented to users within a predefined screen area.

In various embodiments, the service interface application 182 utilizes a number of innovative techniques. For example, a first technique utilizes one or more direct-attached media-specific tools. When selecting any media object on the stage, a highlight rectangle appears around the object. Attached to the rectangle around the media object are a number of tools, some generic for all media types, others specific to the media type. By showing the tools in close proximity to the media object, it is easier for users to understand the relationship of the tool to the media object.

For each tool, an edge may be specified (e.g., expressed as a number from 0-3, 0=top, 1=right, 2=bottom and 3=left), a position along the edge (e.g., expressed as a ratio of edge length) and an offset from the edge (e.g., expressed as a factor of the tool's size). Whenever updating a position of a tool, an absolute position may be calculated or recalculated based on various parameters.

In another example, another technique utilizes a rotation invariant display of tools. If a user 102 rotates a media object using a rotate tool, the associated tools remain fixed to the original object constraint point (i.e., they do not rotate, thereby making it easier for the user to read the icons). Once a rotation is complete, the attached edge is calculated or recalculated based on the perceived edge, and if necessary fades the tool out from a previous location to a new location. As such, the user 102 may be accustomed to finding certain tools in certain positions relative to a media object, irrespective of the media object's rotation.

In another example, another technique utilizes a slide tool. When working with media that may progressively move in a particular direction, user selection and manipulation of individual media objects may become a challenge. Traditional techniques of multiple selection and direct manipulation break down when dealing with large documents. The slide tool allows the user 102 to perform an action that may be difficult, such as insert or remove horizontal space within a collage or story. The user 102 selects a media object to reveal the media specific tools. The slide tool is affixed to an edge of the media object, and when grabbed, the slide tool selects one or more media objects at or to the other edge of the selected media object, and allows side-to-side sliding during a user action. In one aspect, this technique may be utilized for a vertically oriented collage or story, which would present the slide tool on an upper edge of the selected media object and allow dragging of layers at or below the selected object.

In another example, another technique utilizes a drag and drop insertion. The user 102 may drag thumbnails representing media objects from a media tab and drop them onto the stage or storyboard. As the user 102 drags the thumbnail over the stage, an insertion point indicator is presented to the user 102 showing where an edge of the dropped item may be located during user action, such as, if the user's mouse is released. If the user's mouse hovers over the left edge of any existing media object on the stage, the indicator state switches to an insert mode. If the user releases the mouse while the indicator is in this mode, the underlying media object and all media objects to the right of the left edge of that media object will be offset to the right to allow for the dropped media object to fit on the stage without being obscured.

In another example, another technique utilizes one or more unconstrained animated button icons. Some applications use iconic images to represent actions that the user 102 may perform. As icons become smaller, they are difficult to discern and understand. The service interface application 182 uses animation and unbounded icons to convey visual information. In one aspect, a text tool icon in an idle state is an "A" (other applications often use a T as the text tool). On rollover, the A is revealed to be a window onto a cropped, sliding Add Text message, which animates to an edge. In another aspect, a soundtrack tool may be represented as a musical note, but on rollover, the notes play and rise outside of a representative button. To create these buttons, a designer may designate a static rectangle, which represents traditional bounds of the graphic. These bounds may be used by the button to determine the button bounds and scale. The innovative part is to not force all graphic icon content to lie within these bounds and set the button class to not clip its content. By triggering the animation on rollover, the design may exceed its bounds, while still preserving visual coherence in the idle state.

In another example, another technique utilizes one or more collapsible tabbed containers. When editing a collage or story, a button bar may represent one or more additional editing options. The collapsed bar may comprise a row of buttons, although each icon may be presented as a button rather than an icon. When the user 102 selects at least one of the buttons, the selected button transforms into a tab, and the bar expands horizontally to include the tab content. The user 102 may collapse the bar by selecting a close button in the bar or by selecting the currently open tab.

In another example, another technique utilizes an on-demand loading of media. A presentation may be represented as a document with a plurality of layers. Each layer may include various attributes, including position, scale, visual bounds, associated annotations (i.e., hotspots) and a target media asset, which may have layer specific properties, such as playback behaviors. When a player loads a collage or story, the player requests the first page of the collage document and specifies a number of layers per page. The server returns up to a page worth of layers, sorted by x position in the collage. The player may download one or more pages of layers and create a local indexed list of layers. Then, based on the visual window, the player may filter the layers down to the currently visible. For each layer, if the layer hasn't already been loaded or queued for loading, the layer is queued for loading.

In one implementation, the user 102 may add one or more hotspots to the media presentation or piece. A hotspot may be identified by a title as a cursor is moved over a designated hotspot area. Activating the hotspot by selecting the hotspot area may link the user 102 to additional information relating to the hotspot item. For example, if an automobile is used as a media item within the collage storyboard, a hotspot may link the user 102 to additional information relating to the automobile, such as price, condition, and terms or sale. Hotspots may be specific to one part or element of the media item. In this example, the user 102 may create a hotspot on the tire, which, when opened, may give the viewer access and/or information on the tire, where to buy the tire, etc. Other hotspots may link the user to music or other audio clips, and other media may be uploaded into the collage storyboard from a clipboard or link to sale items posted on the Internet. Once the media piece has been created the media piece may be viewed, saved, previewed and/or published. Once published, the user 102 may have options as to the playback. For example, the media presentation or piece may play continuously until stopped, play only for a specified number of times, play only once, etc.

In various implementations, using the various media creation and publishing tools described herein, a user 102 may quickly and easily create media rich presentations and use those presentations in numerous ways. Some examples include the ability to publish a presentation on a site to sell a particular item or service. For items or services, a media rich presentation may assist the seller with marketing and selling the item or service, which may be valuable for high-end or high-priced items or services. Sellers may be able to cross sell or promote items or services or direct consumers to partner commercial sites using the hotspot feature. Social or dating sites may use these presentations to give its users a meaningful way to present themselves to others. Blogs and personal pages may be more dynamic using RSS feeds, since, for example, a particular user's presentation may be continually changing with new media.

Figure 3:
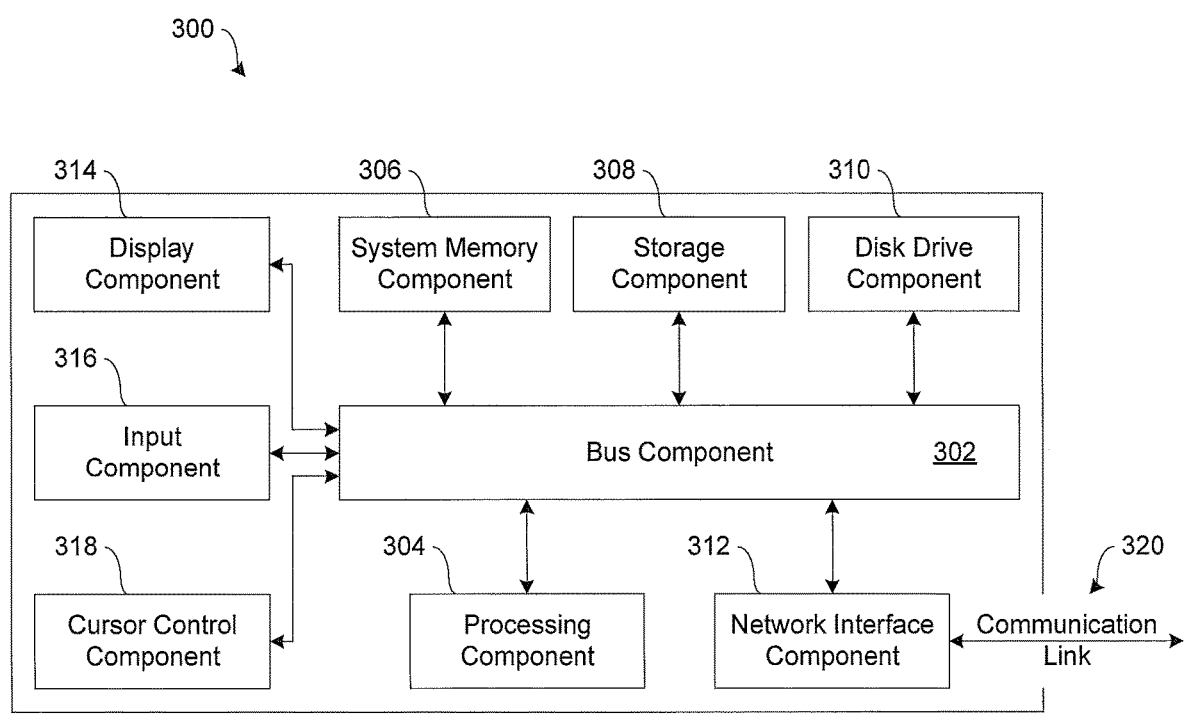
FIG. 3 is a block diagram of a computer system suitable for implementing one or more embodiments of the present disclosure.

FIG. 3 is a block diagram of a computer system 300 suitable for implementing one or more embodiments of the present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 300 in a manner as follows.

In accordance with various embodiments of the present disclosure, computer system 300, such as a personal computer and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), and cursor control component 318 (e.g., mouse or trackball). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 320 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one processor; and
   a non-transitory memory coupled to the at least one processor and storing instructions that, when executed by the at least one processor, perform a method for facilitating presentations over a network, comprising:
      determining, based on received input, a style of a media presentation, the media presentation including photographic images from one or more media resources associated with a social network, the photographic images being associated with a user of the social network;
      generating the media presentation based on the determined style and a link for the media presentation that links the media presentation to the one or more media resources, wherein the generating of the media presentation comprises populating the media presentation with:

the photographic images;
audio;
animation to convey visual information; and
one or more virtual spaces;
storing the media presentation at a service provider;
receiving a request, from the user of the social network, to publish the media presentation to a selected channel of the social network associated with the user;
in response to receiving the request to publish, sharing the media presentation through the selected channel via the social network such that the media presentation can be displayed by a plurality of computing devices, wherein the plurality of computing devices are associated with a plurality of user having access to the selected channel such that the media presentation is automatically loaded into the selected channel associated with the user; and
when the media presentation is viewed, causing the audio to play and the photographic images to move progressively to present the photographic images as a linear narrative, wherein the photographic images and the animation are provided in the virtual spaces and are able to move in multiple directions within at least one of the virtual spaces.

2. The system of claim 1, wherein sharing the media presentation comprises at least one of:
emailing the media presentation to one or more other users via the network;
providing a link to access the media presentation;
embedding source code in a web page; or
providing source code to one or more other users.

3. The system of claim 1, wherein the non-transitory memory further stores the one or more media resources and the media presentation.

4. The system of claim 1, wherein the non-transitory memory stores further instructions for associating identifying information with the media presentation, the identifying information including at least one of a title, a storage location, or a description.

5. The system of claim 1, wherein the non-transitory memory stores further instructions for selecting the audio for the media presentation.

6. The system of claim 1, wherein the non-transitory memory stores further instructions for enabling a user to edit the media presentation.

7. The system of claim 1, wherein the style comprises a kaleidoscope style that supports the movement of the photographic images.

8. A method, comprising:
determining, by a first computing device, photographic images to include in a media presentation, the photographic images stored in one or more media resources associated with a social network, the photographic images being associated with a user of the social network;
generating, by the first computing device, the media presentation and a link for the media presentation that links the media presentation to the one or more media resources, wherein the generating of the media presentation comprises populating the media presentation with:
the photographic images;
audio media;
one or more graphic elements; and
one or more virtual spaces;
storing the media presentation at a service provider;
receiving a request, from the user of the social network, to publish the media presentation to a selected channel of the social network associated with the user;
in response to receiving the request to publish, sharing, by the service provider, the media presentation through the selected channel via the social network such that the media presentation can be displayed by a plurality of computing devices, wherein the plurality of computing devices are associated with a plurality of users having access to the selected channel such that the media presentation is automatically loaded into the selected channel associated with the user; and
when the media presentation is viewed, causing the audio media to play and the photographic images to move progressively to present the photographic images as a narrative, wherein the photographic images and the graphic elements are provided in the virtual spaces and are able to move in multiple directions within at least one of the one or more virtual spaces.

9. The method of claim 8, wherein sharing the media presentation comprises emailing the media presentation to one or more other users via the network.

10. The method of claim 8, wherein sharing the media presentation comprises providing a link to access the media presentation.

11. The method of claim 8, wherein the sharing the media presentation the media comprises embedding source code in a web page of the distribution channel.

12. The method of claim 8, further comprising storing the one or more media resources and the media presentation in a storage component.

13. The method of claim 8, wherein the distribution channel comprises a database for storing the media presentation.

14. The method of claim 8, further comprising selecting, by the first computing device, the audio media for the media presentation.

15. A non-transitory computer-readable storage medium encoding computer executable instructions that, when executed by a processor, perform a method, comprising:
determining one or more photographs to include in a media presentation, the one or more photographs stored at one or more storage locations at one or more servers, wherein the one or more photographs are associated with a user of a social network;
generating the media presentation and a link for the media presentation that links the media presentation to the one or more storage locations, wherein the generating of the media presentation comprises populating the media presentation with:
the one or more photographs;
audio media;
graphic content; and
one or more virtual spaces;
storing the media presentation at a service provider;
receiving a request, form the user of the social network, to publish the media presentation to a selected channel of the social network associated with the user;
in response to receiving the request to publish, sharing the media presentation through the selected channel via the social network such that the media presentation can be displayed by a plurality of computing devices, wherein the plurality of computing devices are associated with a plurality of users having access to the selected channel such that the media presentation is automatically loaded into the selected channel associated with the user; and when the media presentation is viewed, causing the audio media to play and the one or more photographs to move progressively to present the one or more photographic images as a linear narrative, wherein the one or more photographs and the graphic content are provided in the one or more virtual spaces and are able to move in multiple directions within at least one of the one or more virtual spaces.

16. The non-transitory computer-readable storage medium of claim 15, wherein sharing the media presentation comprises at least one of:
   emailing the media presentation to one or more other users via the network;
   providing a link to access the media presentation; or
   embedding source code in a web page;
   providing source code to one or more other users.

17. The non-transitory computer-readable storage medium of claim 15, further comprising instructions for:
   determining a style for the media presentation based, at least in part, on received input; and
   editing the style for the media presentation based, at least in part, on received input.

18. The non-transitory computer-readable storage medium of claim 15, further comprising instructions for associating identifying information with the media presentation.

19. The non-transitory computer-readable storage medium of claim 18, wherein the identifying information comprises one or more of a title of the media presentation, a storage location of the media presentation, or a description of the media presentation.

20. The non-transitory computer-readable storage medium of claim 15, further comprising instructions for associating navigation features with the media presentation.

* * * * *